ing Incidence Spectrometer,"Appl. Opt., vol. 27, 1988, pp. 200–202.

United States Patent [19]
Hettrick

[11] Patent Number: 4,991,934
[45] Date of Patent: Feb. 12, 1991

[54] VARIED SPACE DIFFRACTION GRATING AND IN-FOCUS MONOCHROMATOR

[76] Inventor: Michael C. Hettrick, P.O. Box 8046, Berkeley, Calif. 94707

[21] Appl. No.: 392,428

[22] Filed: Aug. 10, 1989

[51] Int. Cl.$^5$ .............................................. G02B 5/18
[52] U.S. Cl. ........................ 350/162.21; 350/162.23; 356/328; 356/334
[58] Field of Search ............... 350/162.21, 162.22, 350/162.24, 162.23, 162 R; 356/334, 328

[56] References Cited

U.S. PATENT DOCUMENTS

| | | | |
|---|---|---|---|
| 4,027,975 | 6/1977 | Turner et al. | 356/100 |
| 4,192,994 | 3/1980 | Kastner | 250/280 |
| 4,241,999 | 12/1980 | Pouey | 356/331 |
| 4,312,569 | 1/1982 | Harada | 350/162 R |
| 4,398,823 | 8/1983 | Brown | 356/334 |
| 4,492,466 | 1/1985 | Aspnes | 356/334 |
| 4,578,804 | 3/1986 | Meekins | 378/84 |
| 4,776,696 | 10/1988 | Hettrick | 356/328 |

OTHER PUBLICATIONS

F. M. Gerasimov et al., "Concave Diffraction Gratings with Variable Spacing", Opt. & Spectrosc. (U.S.A.), vol. 28, No. 4, 1979, pp. 423–426.
H. A. Rowland, "On Concave Gratings for Optical Purposes,", Phil. Mag., vol. 16, 1883, pp. 197–210.
T. Harada et al., "A Grazing Incidence Monochromator with a Varied-Space Plane Grating for Symchrotron Radiation," SPIE vol. 350, 1984, pp. 114–118.
G. Monk, "A Mounting for the Plane Grating," J. Opt. Soc. Am., vol. 17, 1928, pp. 358–364.
T. Namioka, "Theory of the Concave Grating III, Seya-Namioka Monochromator," J. Opt. Soc. Am., vol. 49, 1959, pp. 951–961.
M. C. Hettrick et al., "Stigmatic High Throughput Monochromator for Soft X-Rays," Appl. Opt., vol. 25, 1986, pp. 4228–4231.
M. C. Hettrick et al., "Variable Line-Space Gratings: New Designs for Use in Grazing Incidence Spectrometers," Appl. Opt., vol. 22, 1983, pp. 3921–3924.
M. C. Hettrick, "High Resolution Gratings for the Soft X-Ray," Nucl. Instrum. Meth., vol. A-66, 1988, pp. 404–413.
M. C. Hettrick et al., "Resolving Power of 35,000 (5 mA) in the Extreme Ultraviolet Employing a Grazing Incidence Spectrometer,"Appl. Opt., vol. 27, 1988, pp. 200–202.

Primary Examiner—Bruce Y. Arnold
Assistant Examiner—J. P. Ryan

[57] ABSTRACT

An optical system and method comprising a diffraction grating which consists of diffracting elements spaced from one another by unequal distances. Correction of residual defocusing in the image produced by such a grating is accomplished by translating it along its surface. As one embodiment, a monochromator is constructed on which a self-focusing grating scans the value in wavelength which is transmitted between fixed slits by rotation of the grating about an axis fixed in space. Combined with a translation of the grating along its surface, such a monochromator produces a symmetrical image exactly in focus at the exit slit for all scanned wavelengths.

33 Claims, 5 Drawing Sheets

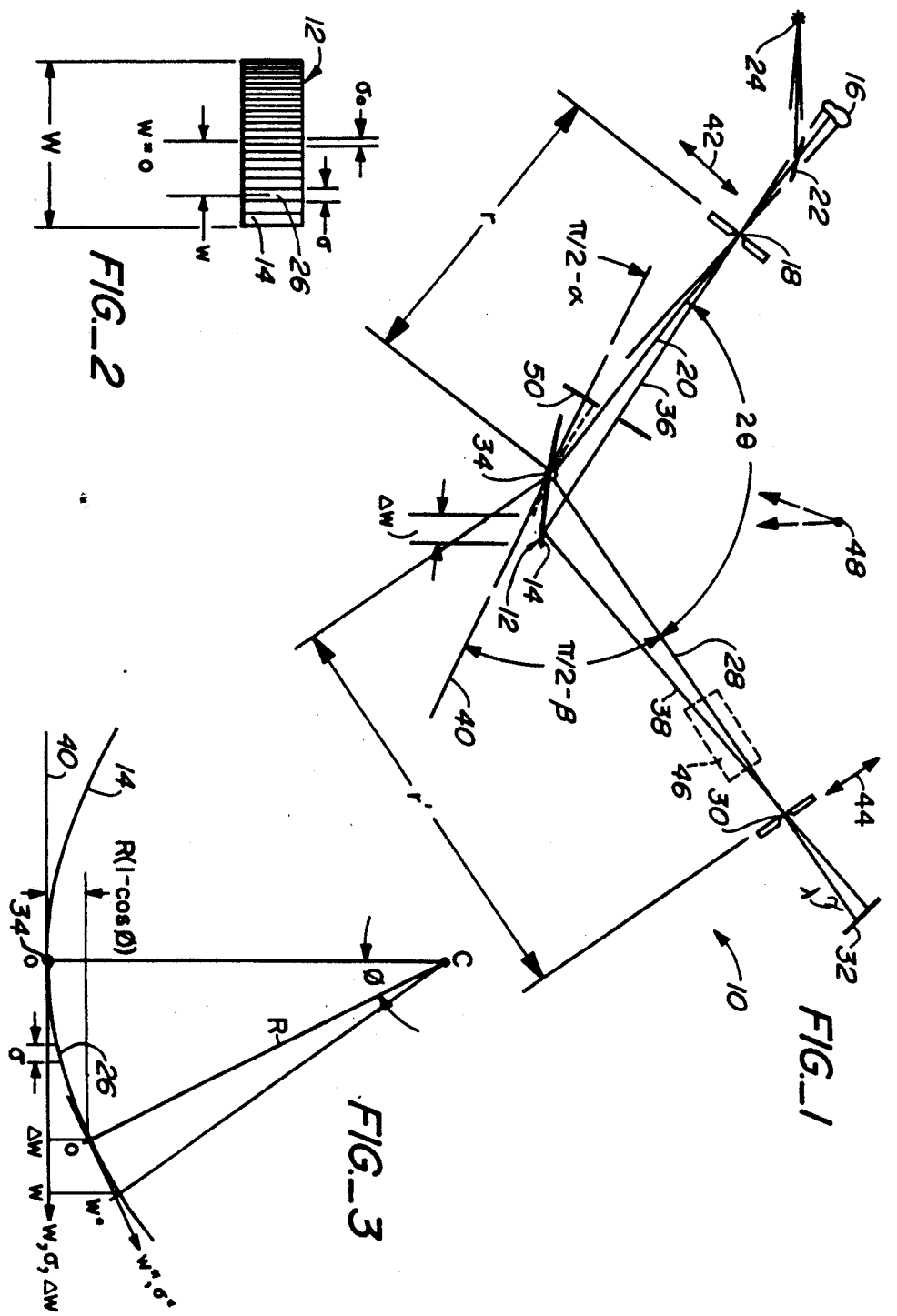

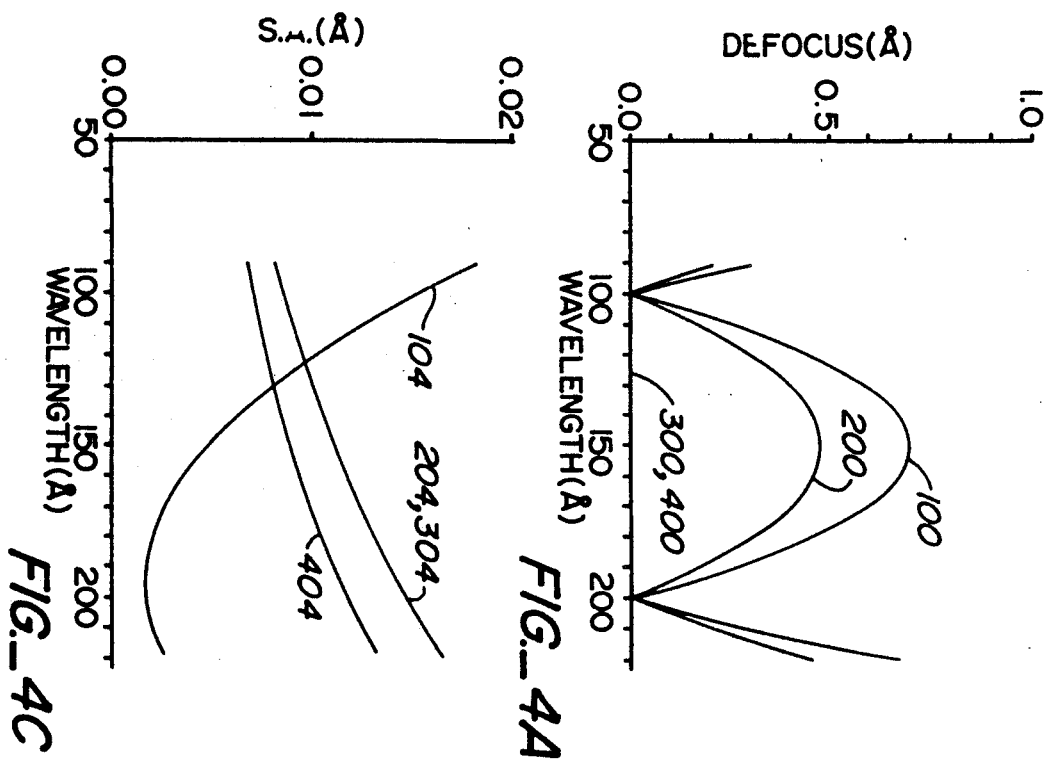
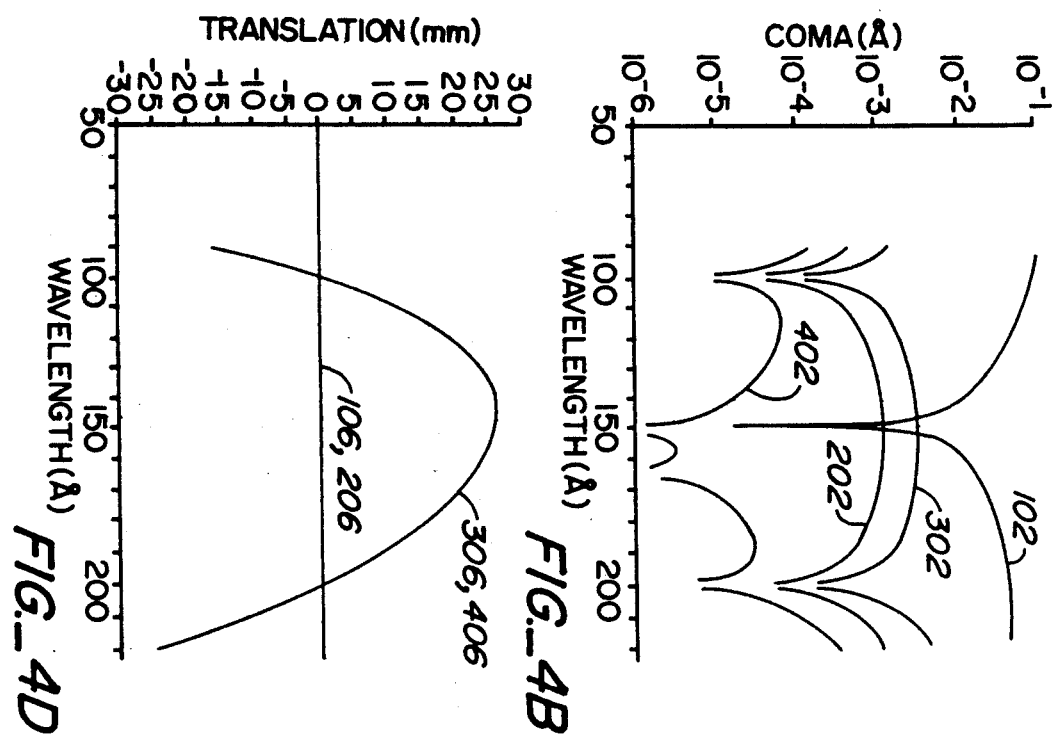

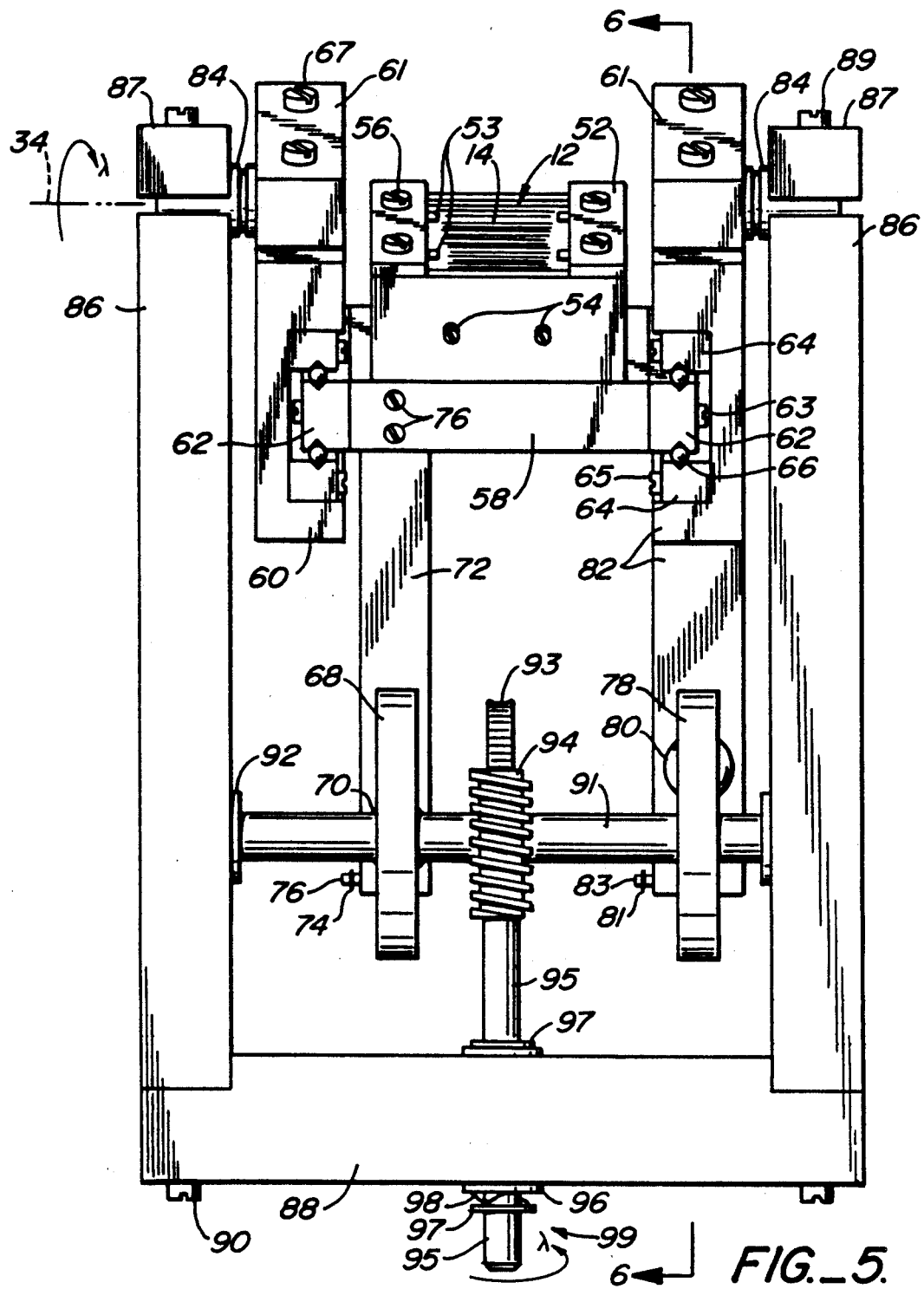
FIG._5.

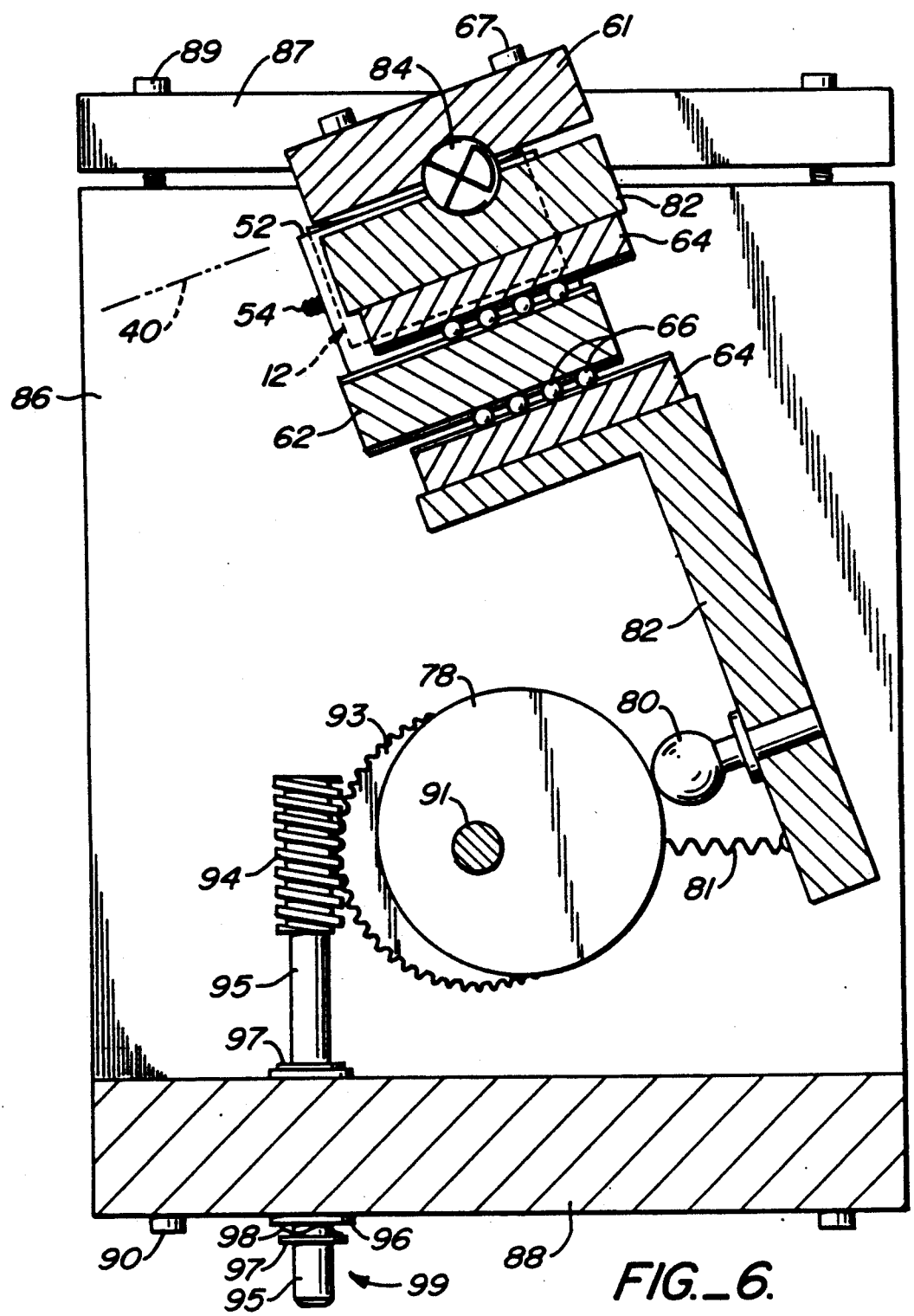
FIG._6.

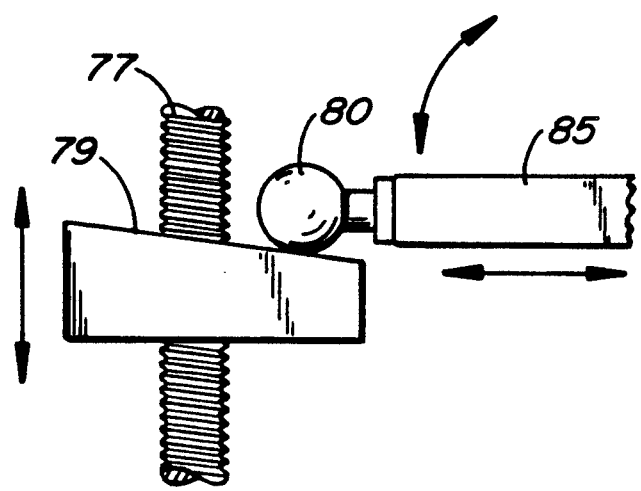
FIG._7

VARIED SPACE DIFFRACTION GRATING AND IN-FOCUS MONOCHROMATOR

BACKGROUND OF THE INVENTION

This invention relates to a novel optical system which has several inherent advantages over existing monochromators employing electromagnetic radiation and operating at grazing incidence.

Rowland (1883) was the first to design a self-focusing diffraction grating, thereby constructed a reflection grating monochromator consisting of a single element having useable efficiency. The Rowland grating comprises grooves equally spaced along the chord of a concave spherical surface. The spectral images are in focus along a circle whose diameter equals the grating radius of curvature. Monochromators based upon this design require effective movement of at least one of the slits along the Rowland circle during the wavelength scan.

To provide useable reflection efficiency for wavelengths shorter than approximately 1000 Å, the grating is generally operated at grazing incidence. In this application, designs based upon the Rowland grating become increasingly cumbersome, due to the fact that the Rowland circle must also lie at a grazing angle relative to the light rays. Thus, the required slit movements become enormous, resulting in complex mechanical designs and large vacuum and mounting structures. In addition, optimal relaying and refocusing of the light is obtained only if the attached target chamber and/or light source chamber is moved in concert with the slit(s). The expense and mechanical awkwardness of such systems prohibits their widespread use as a practical method of achieving high resolution.

Modern grazing incidence embodiments of the Rowland concept (e.g. Brown et al., U.S. Pat. No. 4,398,823) have been adapted to use with fixed beam directions, but only with the introduction of auxiliary mirrors which must undergo complicated motions in concert with the grating scan and translation of one slit along the beam direction. Absent of such undesirable complications, a conventional concave grating can simply be rotated about its pole to select the wavelength diffracted between fixed slits, as demonstrated by the Hettrick et al (1986) "high throughput monochromator." Due to a drastic departure from the Rowland condition, such an optical system is limited to low or moderate spectral resolution as discussed by Hettrick (1988).

Recently, monochromators have been developed which employ diffraction grating designs in which the grating surface comprises groove elements which are spaced from one another by systematically varying distances. Such monochromators can exhibit improved performance compared to those which employ conventional equally spaced gratings, due to the extra degree of freedom delivered by a judicious choice of the variation in groove spacings. In this way, aberrations in the image may be reduced or eliminated at one or more wavelengths, resulting in higher spectral and/or spatial resolution.

Prior art designs employing this idea have achieved wavelength scanning in one of two ways, through either pure rotation of the grating or through pure translation of the grating. At normal or near normal incidence (e.g. Seya-Namioka mount), a given varied spacing on a concave surface can maintain an improvement in the resolution over a broad wavelength region as the grating is purely rotated (Harada et al., U.S. Pat. No. 4,312,569). However, at grazing incidence no net improvement is obtained in this manner. Therefore, prior art grazing incidence varied-space designs which scan wavelength through pure rotation of the grating have utilized a plane (or large radius) grating in combination with an auxiliary mirror. This mirror has either been flat and undergone a complicated scanning motion (Harada et al., 1984) or be highly figured to provide focusing in the dispersion direction of the grating (Hettrick et al., U.S. Pat. No. 4,776,696; Hettrick 1988; Hettrick et al., 1988; Pouey, U.S. Pat. No. 4,241,999). Any such auxiliary mirrors decrease the efficiency, add to the size and expense of the resulting monochromator, and introduce additional sources of fabrication and alignment errors. The method of pure grating translation (Aspnes, U.S. Pat. No. 4,492,466) employs a long cylindrical grating requiring a variation in groove spacing which is at least as large as the wavelength region which may be scanned, imposing a severe technical limitation on the grating fabrication. In none of the above designs are the images perfectly in focus at all scanned wavelengths, this condition being only approximately met at a linearly increasing level of accuracy as the numerical aperture is reduced.

A monochromator which employs a varied-space diffraction grating which is self-focusing, requires only modest amounts of variation in the groove spacings, produces spectral images which are in focus at all scanned wavelengths, and operates at grazing incidence with fixed slit positions and beam directions, would be a great advance in the field of optics.

SUMMARY OF THE INVENTION

In accordance with the present invention, a novel and useful optical system for a monochromator is provided.

The system of the present invention may utilize a diffraction grating which focuses radiation from an entrance slit or other source through an exit slit (or onto a target). The wavelength transmitted through the exit slit is scanned by rotating the surface of said grating about an axis fixed in space. The grating surface comprises grooves whose spacings are unequal. At each orientation of the grating corresponding to a particular scanned wavelength, the grating is also translated in the direction of its surface tangent. Given a sufficiently high degree of variation in the groove spacing, this translation provides complete freedom to bring each wavelength into an exact focus, even if both the entrance slit and exit slit are fixed in position. Further, by choosing the slit distances and groove spacing function appropriately, higher order aberrations may also be eliminated at several chosen discrete wavelenghts.

The novelty of this scheme can be appreciated from the fact that such translation would have no effect upon the properties of a conventional (equally-spaced) grating. As varied space gratings are only presently becoming accepted as viable designs, the very existence of this additional degree of freedom is not appreciated in the prior art. Thus, the grating itself cannot be derived as simply an aberration-corrected version which improves the performance of a previously existing monochromator design. In contrast, the Harada et al., concave grating design is an improvement over an equally-spaced grating when both are situated in a Seya-Namioka mount (Namioka, 1959); while the Hettrick plane grating design can be viewed as an improvement over an equally-spaced grating when both are situated in a Monk-Gillieson mount (Monk, 1928). However, the present invention is both that of the grating and its mounting, which takes specific advantage of the fundamental properties and practical limitations of varied spacing.

When combined with a rotation which provides for broad wavelength selection, the required amounts of space variation and translation are easily within existing limits of grating manufacture and mechanical design. Because the grating translates along its surface, the fixed axis about which the grating rotates may always intersect the grating surface at the same point in space, and thus the direction of the (principal) ray which strikes this point is fixed both incident and diffracted through the slits.

More than one such configuration may be placed in series, to form a multiple grating monochromator having improved spectral resolution (i.e. additive dispersion) or temporal resolution (i.e. common-path-length).

Although not required in order to provide spectral resolution, additional optics may be inserted in this optical design for the purpose of focusing in the direction perpendicular to dispersion (i.e. controlling or eliminating astigmatism).

It may be apparent that an improved optical system for a monochromator has been described.

It is therefore an object of the present invention to provide an optical system which possesses high efficiency due to the presence of a minimum number of optical elements.

Another object of the present invention is to provide an optical system which enables scanning over a broad range in wavelength.

Yet another object of the present invention is to provide an optical system which is perfectly in focus at all scanned wavelengths, providing high spectral resolution.

A further object of the present invention is to provide a symmetrical image, which enables enhancement of the resolution through modeling of the image profile.

Another object of the present invention is to provide an optical system which employs slits (or object and image) which are fixed in space.

Yet another object of the present invention is to provide an optical system whose principal ray is fixed in direction both incident to an exiting the slits (or object and image).

A further object of the present invention is to employ optical surfaces which can be easily and inexpensively fabricated to precise tolerances, enabling the practical realization of high resolution.

Another object of the present invention is to provide a monochromator consisting of a single optical element, thereby allowing the construction of a compact and lightweight vacuum or mounting structure which may be easily transported, or inexpensively deployed in environments above the atmosphere.

The invention possesses other objects and advantages especially as concerns particular characteristics and features thereof, which will become apparent as the specification continues.

BRIEF DESCRIPTION OF THE DRAWINGS

FIG. 1 is a side schematic view of the optical layout of the present invention.

FIG. 2 is a top plan schematic view of the grating of the present invention.

FIG. 3 is a sketch of the coordinate systems used for defining the varied spacing before and after translation of the grating by an amount $\Delta w$ along a chord to its surface.

FIG. 4 is a set of graphs depicting the optical aberrations as functions of scanned wavelength for a concave grating, employing both the prior art and the present invention, and the grating translation required in the present invention.

FIG. 5 is a front elevational view of the mechanical assembly of the grating stage of the present invention.

FIG. 6 is a side elevational view in partial section generally taken along the line 6—6 of FIG. 5.

FIG. 7 is a side detail view of a lead screw and inclined plane pusher block arrangement in place of the wavelength cam shown in FIG. 6.

Drawing referenced numerals:
10—optical system,
12—diffraction grating,
14—grating surface,
16—extended light source,
18—entrance slit,
20—incident principal ray,
22—pre-optic,
24—compact light source,
26—grating groove,
28—diffracted principal ray,
30—exit slit,
32—target,
34—grating rotation axis,
36—incident extremum ray,
38—diffracted extremum ray,
40—rotated grating surface (dashed) tangent line at rotation axis 34,
42—transverse positioning means for entrance slit,
44—transverse positioning means for exit slit,
46—optional orthogonal focusing mirror,
48—visible alignment source,
50—entrance grating aperture baffle,
52—grating holder,
54—grating set screws,
56—grating holder mounting bolts,
58—slide plate,
60—end plate,
61—end plate pivot clamps,
62—inner ways,
63—inner way mounting bolts,
64—outer ways,
65—outer way mounting bolts,
66—ball bearings,
68—grating translation cam,
70—grating translation cam contact ball,
72—grating translation bar,
74—translation bar extension spring,
76—extension spring pins,
77—lead screw,
78—wavelength drive cam,
79—inclined plane pusher block,
80—wavelength drive cam contact ball,
81—wavelength cam extension spring,
82—wavelength drive radius bar/end plate,
83—wavelength cam spring pins,
84—end plate flexural pivots,
85—alternate radius bar, oriented parallel to translation,
86—stationary support members,
87—support member pivot clamps,
88—base plate,
90—support members mounting bolts,
91—cam shaft,
92—cam shaft radial bearings, 93—anti-backlash worm gear,
94—worm,
95—drive shaft,
96—drive shaft radial/thrust bearings,
97—drive shaft retaining rings,
98—drive shaft leaf spring,
67—end plate/pivot mounting screws,
99—external rotation means,
100—prior art defocusing,
102—prior art coma,
104—prior art spherical aberration,
106—prior art grating translation (zero),
200—defocusing with no grating translation,
202—coma with no grating translation,
204—spherical aberration with no grating translation,
300—defocusing (zero) with grating translation,
302—coma with grating translation,
304—spherical aberration with grating translation,
306—required grating translation,
402—coma with grating translation and spherical term,
404—spherical aberration with translation and spherical term,
406—required grating translation with spherical term,
206—grating translation (zero) corresponding to curve 200.

DESCRIPTION OF THE PREFERRED EMBODIMENT

Various aspects of the invention will evolve from the following detailed description of the preferred embodiments thereof which should be taken in conjunction with the hereinbefore described drawings.

The optical layout of the invention as a whole is shown in FIG. 1 by referenced character 10. Optical system 10 includes as its key element a diffraction grating 12, as shown in FIGS. 1 and 2. The grating has a surface 14 which is reflective to the electromagnetic radiation of interest which is emitted by an extended source 16 and passes through an entrance slit 18 along a principal axis 20. Pre-optics 22 may be inserted between a compact source 24 and the entrance slit in order to efficiently direct the passage of such light. The reflective surface of the grating is composed of a set of minute grooves 26 which provides an interference pattern in the reflected (i.e. diffracted) beam exiting the grating along a principal axis 28. An exit slit 30 may be employed to allow passage of an exceedingly narrow band of wavelengths $\Delta\lambda$ to a target or other detection means 32. In this manner, optical system 10 effectively transmits only a desired wavelength emitted by the source, and hence performs the function of a monochromator.

To provide focusing in the direction of the grating grooves (i.e. normal to dispersion), a mirror 46 may be interposed anywhere between the light source 16 and the target 32. If the mirror is cylindrical and oriented orthogonal to the grating surface, this arrangement can greatly concentrate or collimate the image intensity at the target (or any intermediate position) without sacrifice of spectral resolution. However, an actual mirror will possess slope errors (ripples, twisting, etc.) and other surface irregularities which will distort the wavefront in the dispersion direction of the grating. This will degrade the spectral resolution unless the mirror is placed on the side of either slit opposite the grating. If such a mirror is placed between the exit slit and the target, then the focusing of light through the entrance slit by the pre-mirror will also not degrade. In addition, a post-mirror (not shown), similar in function to the pre-mirror, can be used to further concentrate the image brightness by refocusing or collimating the exit slit onto the target in the dispersion direction.

To provide selection of the desired transmitted wavelength, the grating is rotated about a fixed axis 34 so as to scan a continuous band of wavelengths past the exit slit, as depicted in FIG. 1. To maintain a fixed beam direction for principal light rays 20 and 28 which intersect at the grating center (or pole) w=0, the rotation axis is preferred to pass through this pole. Given a constant included angle, $2\theta$, between the incident principal ray 20 and diffracted principal ray 28, the required angle of incidence, $\alpha$, and angle of diffraction, $\beta$, relative to the grating surface normal are:

$$\alpha = \theta - \arcsin[m\lambda/(2\sigma_o \cos\theta)], \quad \beta = 2\theta - \alpha \qquad (1)$$

where $\sigma_o$ is the groove spacing at the pole, and m is the spectral order.

Entrance slit 18 and exit slit 30 are ideally provided with transverse positioning means 42 and 44, respectively. This enables adjustment of the angle $2\theta$ and thereby using equation (1) provides an accurate absolute wavelength calibration. Such slit assemblies may be Model VSA-300 available commercially from Hettrick Scientific, Inc. Such alignment, and also the rotational alignment of the slit length along the direction of the grating grooves, may be facilitated by use of a visible alignment source 48 incident normally on the grating surface and diffracted through the slits.

To minimize the optical aberrations, the spacings between the grating grooves 26 are allowed to vary as a function of their position, w, across the grating surface. Such a function may be expressed in various ways, but for purposes of illustrating the degree of aberration correction provided, it is written here as a polynomial:

$$1/\sigma = 1/\sigma_o + N_2 w + N_3 w^2 + N_4 w^3 + \ldots \qquad (2)$$

where $N_i$ are constant coefficients which determine the local spacings between the centers of each groove, where i=2,3,4, etc.

Given straight grooves, the error $\Delta L$ in path length between entrance and exit slit, and the resulting optical aberration $\Delta\lambda$ in wavelength for a non-principal ray 36 which strikes aperture coordinate w (FIG. 1) is given to a good approximation by:

$$\Delta L = \tfrac{1}{2}(F_2 w^2 + F_3 w^3 + F_4 w^4 + \ldots) \qquad (3)$$

and $$\Delta\lambda = (\sigma_o/m)(F_2 w + 3/2 F_3 w^2 + 2 F_4 w^3 + \ldots) \qquad (4)$$

where $$F_2 = T + T' + m\lambda N_2 \qquad (5)$$

$$F_3 = -T(\sin\alpha)/r + T'(\sin\beta)/r' + \tfrac{2}{3}m\lambda N_3 \qquad (6)$$

$$F_4 = T[(\sin\alpha)/r]^2 - \tfrac{1}{2}T^2/r + \tfrac{1}{2}[1/r - (\cos\alpha)/R]/R^2 + T'[(\sin\beta)/r']^2 - \tfrac{1}{2}T'^2/r' + \tfrac{1}{2}[1/r' - (\cos\beta)/R]/R^2 + \tfrac{1}{2}m\lambda N_4 \qquad (7)$$

where $$T = (\cos^2\alpha)/r - (\cos\alpha)/R, \quad T' = (\cos^2\beta)/r' - (\cos\beta)/R \tag{8}$$

and where R is the radius of curvature of the grating, r is the length of principal ray 20 connecting the entrance slit and the grating pole, and r' is the length of diffracted principal ray 28 connecting the grating pole and the exit slit.

The image at the transmitted wavelength is considered to be "in focus" if $F_2 = 0$, and the image profile is to a first order of approximation symmetrical if there is no coma ($F_3 = 0$). Given the constraint of fixed entrance and exit slits, these two conditions may both be honored at two wavelengths of choice, $\lambda_1$ and $\lambda_2$, if the grating has a finite radius and is simply rotated about its pole to select wavelength. From equations 1-8, this solution leads to the following choice of parameters:

$$1/r = (\sqrt{b^2 - 4ac} - b)/(2aR) \tag{9}$$

$$1/r' = \delta/r - \epsilon/R \tag{10}$$

$$N_2 = -(T_1 + T'_1)/(m\lambda_1) \tag{11}$$

$$N_3 = 3/2[T_1(\sin\alpha_1)/r - T'_1(\sin\beta_1)/r']/(m\lambda_1) \tag{12}$$

where subscripts 1 and 2 refer to the quantity as determined using $\alpha$ and $\beta$ derived from equation (1) at the chosen wavelengths $\lambda_1$ and $\lambda_2$, and where for conciseness of equations (9) and (10) the following dimensionless parameters are defined:

$$a = \gamma \sin\alpha_1 \cos^2\alpha_1 - \sin\alpha_2 \cos^2\alpha_2 - \gamma\delta^2 \sin\beta_1 \cos^2\beta_1 + \delta^2 \sin\beta_2 \cos^2\beta_2 \tag{13}$$

$$b = -\gamma \sin\alpha_1 \cos\alpha_1 + \sin\alpha_2 \cos\alpha_2 + 2\gamma\delta\epsilon \sin\beta_1 \cos^2\beta_1 - 2\delta\epsilon \sin\beta_2 \cos^2\beta_2 + \gamma\delta \sin\beta_1 \cos\beta_1 - \delta \sin\beta_2 \cos\beta_2 \tag{14}$$

$$c = -\gamma\epsilon^2 \sin\beta_1 \cos^2\beta_1 + \epsilon^2 \sin\beta_2 \cos^2\beta_2 - \gamma\epsilon \sin\beta_1 \cos\beta_1 + \epsilon \sin\beta_2 \cos\beta_2 \tag{15}$$

$$\delta = (\gamma \cos^2\alpha_1 - \cos^2\alpha_2)/(\cos^2\beta_2 - \gamma \cos^2\beta_1) \tag{16}$$

$$\epsilon = [\gamma(\cos\alpha_1 + \cos\beta_1) - (\cos\alpha_2 + \cos\beta_2)]/(\cos^2\beta_2 - \gamma \cos^2\beta_1) \tag{17}$$

and $$\gamma = \lambda_2/\lambda_1 \tag{18}$$

Input parameters of a numerical example may be:
$\sigma_0 = 1/1500$ mm
$R = 10$ meters
$2\theta = 164°$
$m = +1$
$\lambda_1 = 100$ Å
$\lambda_2 = 200$ Å
$w_{min} = -25$ mm
$(W = 50$ mm$)$
$w_{max} = +25$ mm From equations 9-18, the resulting design parameters are determined to be:
$r = 1011.488$ mm
$r' = 964.542$ mm
$N_2 = -1.63766$ mm$^{-2}$
$N_3 = +0.00267255$ mm$^{-3}$ Using these parameters, curves 200, 202 and 204 of FIG. 4 are the individual optical aberrations calculated from equations 1 through 8 as functions of the selected wavelength. As constrained above, the resolution is extremely high in the immediate vicinity of the two chosen correction wavelengths (100 Å and 200 Å). However, because equation 5 provides for the same optimum value of $N_2$ only for these discrete wavelengths, the image sharpness degrades rapidly elsewhere. The result is a spectral resolution which is generally as poor as the prior art design (Hettrick et al, 1986) employing an equally-spaced spherical grating (curves 100, 102 and 104) with the same groove density, angular deviation and system length ($r + r'$).

To overcome this limitation, a trick is employed which takes full advantage of the fact that the grating grooves are unequally spaced. At each wavelength other than the two chosen ones, the grating is translated along its surface tangent. This effectively changes the grating parameters as continuous functions of the amount of translation $\Delta w$. Due to the large radius of curvature R, the movement of the grating surface away from its rotation axis is small $[R(1 - \cos\phi)]$ if the grating is translated along the straight chord 40 fixed relative to the grating surface (FIGS. 1, 3). Thus, in practice the grating translation need not be constrained strictly along the curved grating surface, greatly simplifying the mechanical design (discussed below). From the geometry defined in FIG. 3, it follows that equations 1-8 remain valid with the following substitutions:

$$w \to w^* \tag{19}$$

$$1/\sigma_0 \to 1/\sigma_0^* = 1 - /\sigma_o(1 - \tfrac{1}{2}\phi^2) + N_2\Delta w(1 - \tfrac{1}{2}\phi^2) + N_3\Delta w^2 + N_4\Delta w^3 \tag{20}$$

$$N_2 \to N_2^* = -\phi/(R\sigma_o) + N_2(1 - 2\phi^2) + 2N_3\Delta w + 3N_4\Delta w^2 \tag{21}$$

$$N_3 \to N_3^* = -\phi^2/(4R^2\sigma_o) - 3/2N_2(1 + 2/9\phi^2)\phi/R + N_3(1 + \tfrac{1}{2}\phi^2) + 3N_4(1 + 1/6\phi^2)\Delta w \tag{22}$$

$$N_4 \to N_4^* = -\tfrac{1}{2}\phi/(R^3\sigma_o) - 4/3N_2(\phi/R)^2 + 4/3N_3\phi/R + N_4(1 + 2\phi^2) \tag{23}$$

where $$\phi = \arcsin(\Delta w/R) \tag{24}$$

and where terms in the groove space variation (equation 2) higher than $N_4$ have not been retained. Note that $\phi = 0$ for a plane grating.

Using the same numerical parameters previous given (and setting $N_4 = 0$), curves 300, 302 and 304 of FIG. 4 are the calculated results of optimizing $\Delta w$ to eliminate defocusing at each wavelength, by numerical iteration of equations (20) and (21) with $\phi$ chosen such that $F_2 = 0$ from equation (5). All wavelengths are now sharply in focus, the new limit to the optical resolution being spherical aberration, which decreases as the third power of the numerical aperture. It therefore has a resolvable half-energy width approximately a factor of four smaller than the extremum aberration plotted in FIG. 4C. The resulting spectral resolution has thus improved approximately two orders of magnitude, from 0.5 Å (curve 200) to 0.003 Å (curve 304 divided by four).

Further correction is available by use of non-zero values for $N_4$. From equation (22) it is clear that this term will significantly change the substituted value of $N_3^*$ as the grating is translated ($\Delta w \neq 0$). Through iteration of the above numerical example, it was determined that a value of $N_4 = -6.99 \times 10^{-7}$ mm$^{-4}$ eliminates coma near the center of the spectrum (curve 402), with the coma becoming in practice negligible elsewhere compared to the spherical aberration (which itself has been reduced in the process, as seen in curve 404). The resulting symmetrical image allows the use of accurate modeling techniques to further enhance the spectral resolution of a recorded spectrum.

As plotted in FIG. 4D, only modest amounts of translation are required, thereby allowing efficient use of the grating aperture while maintaining a fixed beam direction. Furthermore, because this motion functions to remove only a modest amount of residual aberration the required accuracy of translation is trivial by contemporary standards.

Due to the grating translation, an unbaffled grating will give rise to an angular aperture whose center (or effective principal axis) shifts by an equal amount. If this needs to be eliminated, then an entrance baffle 50 (FIG. 1) may be inserted prior to the grating to ensure underillumination. A translation of $\Delta w$ combined with a full grating ruled width of W, leads to a baffled grating width of $W - \Delta w$. In the above numerical example, the assumed baffled width of 50 mm and the translation of 25 mm requires a ruled grating width of 75 mm. Thus, only a modest amount of the grating is unused.

The small required grating size, modest translational travel, undemanding translation accuracy and ability to use simple rectilinear motion, leads to a simple and compact mechanical design (FIG. 5), using commercially available components. Grating 12 is contained in a holder 52 by use of set screws 54 which are threadingly engaged in the holder. To prevent distortion of the grating surface, set screws 54 may be spring-loaded ball plungers, such as part no. 10001P manufactured by Northwestern Tools, Inc. of Dayton, Ohio. The grating surface 14 is registered against pins 53 attached to the holder. By means of screws 56, holder 52 is rigidly bolted to slide plate 58 which translates relative to end plates 60 and 82 by means of interposed inner ways 62 bolted to the slide plate by screws 63, outer ways 64 bolted to the end plates by screws 65, and ball or roller bearings 66. Thus, grating 12 is allowed to translate along the direction 40 (normal to the plane of FIG. 5) as illustrated in FIG. 1. Bearing assemblies consisting of hardened ways and bearings are commercially available from numerous sources, and need not be discussed further. The translation is driven by a rotating cam 68 which is in surface contact with a spherical ball 70 press fit into a bar 72 which is bolted to the slide plate 58 by means of screws 76. This surface contact can be assured by extension spring means 74 connecting the cam 68 and the bar 72 by use of pins 76 attached to both members.

The grating rotation is also driven by a rotating cam 78 maintained in surface contact with a ball 80 press-fit into a radius bar 82, by spring and pin means 81 and 83, respectively, as detailed in FIG. 6. Radius bar 82 also functions as one of the end plates as discussed above. Both end plates 60 and 82 are supported by pivots 84 mounted by means of clamps 87 bolted to the stationary end members 86 using screws 89. Similarly, clamps 61 provide mounting of the opposite ends of pivots 84 onto end plates 60 and 82 by use of screws 67. Hence, as bar 82 is pushed by cam 78, the end plates 60 and 82 co-rotate about pivots 84 together with the attached grating 12. If pivot 84 is a flexural pivot, then spring 81 and pins 83 are not required.

Support members 86 are affixed to a base plate 88 by means of bolts 90. Correlation of rotation between the cams 68 and 78 is accomplished by mounting them to a common cam shaft 91 going through their centers of rotation. The shaft is free to rotate about is central axis by means of radial bearings 92. An anti-backlash worm gear 93 is also rigidly attached (e.g. press-fit or clamped) to shaft 91 and is driven by a worm 94 connected to a drive shaft 95 which is free to rotate within radial/thrust bearings 96 fit into base plate 88. Translation of worm 94 is prevented by external retaining rings 97, one of which is supported against leaf spring 98.

If external rotation means 99 is applied to drive shaft 96, both the wavelength drive cam 78 and the grating translation cam 68 will rotate synchronously. This provides for the automatic determination of the amount of translation required at each wavelength. To obtain the highest intrinsic mechanical accuracy, the wavelength cam may have a circular surface and be rotated off of its geometrical center, as illustrated in FIG. 6. Alternatively, the cam 78 may be machined to a non-circular shape in accordance with providing a linear relationship between the angle of cam rotation and the selected wavelength. Due to the functional relationship shown in FIG. 4D, as well as the correction necessary to remove the translation of bar 72 due to rotation only of bar 82, the translation cam is theoretically required to have a non-circular shape. However only modest accuracy is required and therefore it may be easily manufactured. The required accuracy may be easily derived from FIGS. 4A and 4D, revealing a defocus of approximately 0.4 Å per 25 mm of travel. Thus, even a 0.5 mm error in translation would result in less than 0.01 Å of residual aberration.

Due to the translation of the varied space grating, the spacing at pole 34 (FIG. 1) will change, and thus a conventional sine-bar mechanism will not result in linearity between the angle of rotation of a lead screw member (engaged to a normal pusher block) and the resulting wavelength selected. However, as the dominant change to the pole spacing is due to the $N_2$ term [equations (2) and (20)], such linearity can be regained to a high degree of accuracy without resort to a cam, by use of an inclined plane as the pusher block. FIG. 7 shows such an optional wavelength drive, in which a lead screw 77 (which may be attached directly or indirectly to drive shaft 95 of FIG. 5) is threadingly engaged into a block 79 whose surface is inclined at an angle to the rotation of the lead screw. In this configuration, a different bar 85 is rigidly attached to slide plate 58 of FIG. 5 and is oriented along the direction 40 of the grating translation. As the translation cam moves this slide plate along the direction of its ways 62 (resulting in a change in the distance from ball 80 to the fixed grating pole 34), the ball 80 attached to radius bar 85 will migrate over the inclined plane pusher. This results in a built-in mechanical correction to the grating angle in linear relationship to the amount of grating translation, as required by the $N_2$ term and the variation in incident angle given by equation (24). For example, given the above numerical example, with $N_2 = -1.63766$ mm$^{-2}$, and a radius bar length of 556 mm, the pusher block inclination angle would be 1.66°. The residual nonlinearity is calculated to be approximately 0.3 Å.

In practice, external means 99 comprise various conventional gears, bearings, cranks, motors, counters, etc. as convenient for the particular application, and to enable accurate monitoring of the grating position and orientation. In addition, as such a mechanism may be used in combination with soft x-ray radiation, it would be situated inside a vacuum, requiring use of conventional rotary motion feedthroughs which are commercially available.

The mechanical couplings between the wavelength selection and grating translation may of course be replaced by separate external drives correlated by a computer.

The use of varied spaced grooves combined with suitable motions of the grating surface as a function of wavelength, permits the virtual elimination of significant optical aberrations in the monochromatic image. Thus, linear dispersion becomes the limiting factor in determining the attainable spectral resolution of such a system. In the above numerical example, the spherical aberration limit of 0.005 Å will be reached only if the slits are approximately 5 microns wide. This motivates the use of two (or more) such systems in series, wherein the individual dispersions add to increase the slit-limited resolution. In such configurations, the exit slit for the first system is placed at the same position as the entrance slit for the second system, and so forth. The use of this intermediate slit is, however, optional, as the additive dispersion will continue to disperse the various wavelengths in a one-to-one mapping onto the final exit slit plane.

Alternatively, the path length for all rays (principal and extrema) may be made constant by use of two (or more) such systems arranged such that the dispersions cancel. In this case, an intermediate slit must be used to eliminate the background of overlapping wavelength images. Such a (common path length) monochromator preserves the time resolution of the incident beam, and is therefore of interest in the context of pulsed sources.

While in the foregoing, a preferred embodiment of the present invention has been set forth in detail for the purposes of making a complete disclosure of the invention, it may be apparent to those of skill in the art that numerous changes may be made in such detail without departing from the spirit and principles of the invention. In particular, optimizations other than equations 9–18 may be devised to minimize the required grating translation over desired wavelength regions, or to eliminate aberrations at other wavelengths.

A plane grating may also be substituted for the concave grating illustrated above, in the case where both object and image are real. In this case, there are insufficient degrees of freedom to provide $\Delta w=0$ at two distinct wavelengths. The required amount of translation necessary to provide in-focus imaging is therefore larger than for the preferred embodiment. However one finds, through use of equations 1–8 and 19–22 with an exceedingly large value for R, that the required translation is minimized if a maximum infinite de-magnification is chosen (i.e. the object is a plane wave, and the image is diffracted into a negative spectral order). Unfortunately, assuming the grating is baffled to maintain a fixed direction for the principal ray, the larger translation requires a correspondingly larger grating.

As another example, the same technique may used to dramatically improve the properties of a plane grating having a virtual image and real object [e.g. the erect field optical system of Hettrick et al., (U.S. Pat. No. 4,776,696)]. As with the concave grating embodiment discussed above, the introduction of grating translation in the latter design will also result in perfectly focused images at all scanned wavelengths, thereby increasing the spectral resolution. In this case, the amount of required translation is very small, due to the fact that the erect field imaging is nearly in focus prior to such translation. However, the improvement is significant for high resolution applications.

As a further example of the versatility of the present invention, the grating surface may be aspherical, which can be used to self-focus in the direction parallel to the grooves without the introduction of an additional mirror reflection.

While in the foregoing, embodiments of the present invention have been set forth in considerable detail for the purpose of making a complete disclosure of the invention, it may be apparent to those of skill in the art that numerous changes may be made in such detail without departing from the spirit and principles of the invention.

In a fundamentally different application, the proposed translation of a varied-space grating may be used by itself (i.e. without any rotation required) to optimize the focusing of any varied-space grating. For example, this method may be used to optimize the resolution of a spectrum recorded by the prior art gratings of Hettrick et al., (1983), Hettrick et al., (U.S. Pat. No. 4,776,696), Harada et al., (U.S. Pat. No. 4,312,569), Harada et al., (1984), or Meekins et al., (U.S. Pat. No. 4,578,804).

Finally, it should be recognized that while the invention has been applied in detail to electromagnetic radiation, it may be utilized in principle with wavelike radiation of any nature, including acoustic waves.

What is claimed is:

1. A grating which comprises:
   a. a concave surface;
   b. a plurality of substantially parallel diffracting elements spaced from each other by unequal distances as projected upon a chord of said concave surface, according to a density function;
   c. an object point substantially fixed in space;
   d. an image point substantially fixed in space;
   e. a first path length equal to the distance which extends between said fixed object point and a first one of said diffracting element plus the distance which extends between said first diffracting element and said fixed image point;
   f. a second path length equal to the distance which extends between said fixed object point and a second one of said differacted element plus the distance which extends between said second diffracting element and said fixed image point;

wherein the difference between said first and second path lengths plus a distance equal to a non-zero integer times a chosen wavelength times an integer equal to one plus the number of diffracting elements intervening said first and said second diffracting elements, defines a path-length error function, said grating characterized in that said concave surface, density function and said object and image points are chosen such that said path-length error function when written as a sum of powers of said chord distance between said first and said second diffracting elements lacks both second and third power terms at more than one distinct said chosen wavelength diffracted from said fixed object to said fixed image, said distinct wavelengths being determined by rotation of said grating about a fixed axis.

2. The grating of claim 1, in which said fixed axis is substantially tangent to one of said parallel diffracting elements.

3. The grating of claim 1, in which said concave surface is substantially spherical and reflecting.

4. The grating of claim 3, in which said density function is written as $$1/\sigma = 1/\sigma_o + N_2 w + N_3 w^2 + N_4 w^3 + \ldots$$

where $\sigma_o$, $N_2$, $N_3$, $N_4$, etc. are constant coefficients, where $\sigma$ is the said chord spacing between neighboring said diffracting elements, and where w is the said chord distance from a reference said diffracting element where said chord is tangent to said spherical surface.

5. The grating of claim 4, in which $$N_2 = -(T_1 + T_1')/(m\lambda_1)$$

$$N_3 = 3/2[T_1(\sin \alpha_1)/r - T_1'(\sin \beta_1)/r']/(m\lambda_1)$$

where $$T = (\cos^2 \alpha)/r - (\cos \alpha)/R, T' = (\cos^2 \beta)/r' - (\cos \beta)/R$$

and $$1/r = (\sqrt{b^2 - 4ac} - b)/(2aR)$$

$$1/r' = \delta/r - \epsilon/R$$

where $a = \gamma \sin \alpha_1 \cos^2 \alpha_1 - \sin \alpha_2 \cos^2 \alpha_2 - \gamma \delta^2 \sin \beta_1 \cos^2 \beta_1 + \delta^2 \sin \beta_2 \cos^2 \beta_2$ $b = -\gamma \sin \alpha_1 \cos \alpha_1 + \sin \alpha_2 \cos \alpha_2 + 2\gamma \delta \epsilon \sin \beta_1 \cos^2 \beta_1 - 2\delta \epsilon \sin \beta_2 \cos^2 \beta_2 \gamma \delta \sin \beta_1 \cos \beta_1 - \delta \sin \beta_2 \cos \beta_2$ $c = -\gamma \epsilon^2 \sin \beta_1 \cos^2 \beta_1 + \epsilon^2 \sin \beta_2 \cos^2 \beta_2 \gamma \epsilon \sin \beta_1 \cos \beta_1 + \epsilon \sin \beta_2 \cos \beta_2$ $\delta = (\gamma \cos^2 \alpha_1 - \cos^2 \alpha_2)/(\cos^2 \beta_2 - \gamma \cos^2 \beta_1)$ $\epsilon = [\gamma(\cos \alpha_1 + \cos \beta_1) - (\cos \alpha_2 + \cos \beta_2)]/(\cos^2 \beta_2 - \gamma \cos^2 \beta_1)$ $\gamma = \lambda_2/\lambda_1$ where subscripts 1 and 2 refer to the quantity as determined using $\alpha$ and $\beta$ given by $$\alpha = \theta - \arcsin [m\lambda/(2\sigma_o \cos \theta)], \beta = 2\theta - \alpha$$

$\lambda_1$ and $\lambda_2$ being two said distinct wavelengths of choice, m being the spectral order, $\theta$ being an angle of choice, $\sigma_o$ being a spacing of choice, and where R is the radius of curvature of said spherical surface.

6. The grating of claim 1, in which said concave surface is a spherical and reflecting.

7. The grating of claim 1, in which the angle subtended by lines drawn from any said diffracting element to said fixed object and to said fixed image, exceeds 140°.

8. The grating of claim 1, in which said distinct wavelengths are electromagnetic wavelengths within the range 3-2500 Å.

9. An optical system comprising:
a. a granting which comprises a surface having substantially parallel diffracting elements spaced from one another by unequal distances as measured along a straight line tangent to the grating surface at a point;
b. means for rotating said grating about an axis substantially fixed in space;
c. means for translating said grating in a direction substantially parallel to a tangent plane of said surface.

10. The optical system of claim 9, in which said surface is concave.

11. The optical system of claim 10, in which said concave surface is substantially spherical and reflecting.

12. The optical system of claim 10, in which said concave surface is a spherical and reflecting.

13. The optical system of claim 9, in which said surface is substantially planar.

14. The optical system of claim 13, used in combination with an incident plane wave.

15. The optical system of claim 13, used in combination with a virtual object, providing a converging wave to said grating.

16. The optical system of claim 9, in which said rotation axis is substantially parallel to said diffracting elements.

17. The optical system of claim 9, in which said rotation axis lies substantially on said surface of said grating.

18. The optical system of claim 9, employed in combination with a source of radiation and a target means receiving said radiation, said grating located between said source and said target means, additionally comprising at least one optical element disposed in the path of light which travels between said source and said target means, said optical element arranged to cause said source radiation to focus in a plane substantially parallel to said diffracting elements.

19. The optical system of claim 18, in which said optical element comprises a concave reflecting surface having a normal which lies substantially within a plane which is parallel to a tangent of said grating surface.

20. The optical system of claim 19, in which said concave reflecting surface is a cylinder.

21. The optical system of claim 19, in which said concave reflecting surface is a sphere, which additionally causes said radiation to focus in the plane which is substantially perpendicular to said diffracting elements.

22. The optical system of claim 18, in which said optical element comprises a concave reflecting surface having a normal which lies substantially within the same plane as a normal to the surface of said grating.

23. The optical system of claim 22, in which said concave reflecting surface is a cylinder.

24. The optical system of claim 22, in which said concave reflecting surface is a sphere, which additionally focuses said radiation in the plane which is substantially perpendicular to said diffracting elements.

25. The optical system of claim 9, additionally comprising at least one narrow opening, or slit, located at a position substantially fixed in space, whereby said slit limits the passage of all but a narrow band of wavelengths diffracted by said grating.

26. The optical system of claim 9 used in combination with electromagnetic radiation having wavelengths in the range 3-2500 Å.

27. The optical system of claim 9, in which said means for rotating said grating and said means for translating said grating are mechanically coupled.

28. The optical system of claim 9, in which said means for rotating said grating comprise a cam.

29. The optical system of claim 9, in which said means for translating said grating comprise a cam.

30. The optical system of claim 9, wherein said means for rotating said grating comprise a bar which translates with said grating.

31. The optical system of claim 30, further including a body which translates in a linear direction, said body having a substantially planar surface which is in contact with said bar, said planar surface being inclined at a finite angle relative to said linear direction.

32. The optical system of claim 9, employed in combination with a source of radiation, additionally comprising an entrance slit and at least one optical element disposed in the path of light which travels between said source and said grating, said optical element arranged to cause said radiation to be efficiently directed to and transmitted through said entrance slit.

33. A method for aligning varied-space gratings in spectrometers and monochromators comprising the steps of:
 a. employing a grating having a surface which is not rotationally symmetric about any line, and which comprises a plurality of substantially parallel diffracting elements spaced from each other by unequal distances as measured along a straight line tangent to said grating surface at a point; and
 b. translating said grating substantially along said surface and in a direction substantially perpendicular to said diffracting elements.

* * * * *

UNITED STATES PATENT AND TRADEMARK OFFICE

Patent No.: 4,991,934                             Page 1 of 3

Dated: Feb. 12, 1991

Inventor(s): Michael C. Hettrick

It is certified that error appears in the above-identified patent and that said Letters Patent is hereby corrected as shown below:

On the title page cited references, change "vol. A-66" to "vol. A266".

On the title page abstract, change "on which" to "in which".

Col. 6, equation (5), change "T + T" to "T + T'".

Col. 6, equation (6), change "T(sinβ)" to "T'(sinβ)".

Col. 6, equation (7), change "T[(sinβ)" to "T'[(sinβ)".

Col. 6, equation (7), change "$-\frac{1}{4}T^2/r'$" to "$-\frac{1}{4}T'^2/r'$".

Col. 7, equation (8), change "$T=(\cos^2\beta)$" to "$T'=(\cos^2\beta)$".

Col. 7, equation (11), change "$T_1+T_1$" to "$T_1+T_1'$".

UNITED STATES PATENT AND TRADEMARK OFFICE

Patent No.: 4,991,934

Dated: Feb. 12, 1991

Inventor(s): Michael C. Hettrick

It is certified that error appears in the above-identified patent and that said Letters Patent is hereby corrected as shown below:

Col. 12, line 44, change "differacted element" to "diffracting element".

Col. 13, line 11, change "$T_1 + T_1$" to "$T_1 + T_1'$".

Col. 13, line 16, change "$T = (\cos^2\beta)$" to "$T' = (\cos^2\beta)$".

Col. 13, line 31, change "$\gamma\delta\sin\beta_1$" to "$+\gamma\delta\sin\beta_1$".

Col. 13, line 34, change "$\gamma\epsilon\sin\beta_1$" to "$-\gamma\epsilon\sin\beta_1$".

Col. 13, line 52, change "a spherical" to "aspherical".

Col. 13, line 61, change "granting" to "grating".

Col. 14, line 9, change "a spherical" to "aspherical".

UNITED STATES PATENT AND TRADEMARK OFFICE

Patent No.: 4,991,934

Page 3 of 3

Dated: Feb. 12, 1991

Inventor(s): Michael C. Hettrick

It is certified that error appears in the above-identified patent and that said Letters Patent is hereby corrected as shown below:

Col. 14, line 38, change "a sphere" to "a asphere".

Col. 14, line 48, change "a sphere" to "a asphere".

Signed and Sealed this

Fourth Day of August, 1992

Attest:

DOUGLAS B. COMER

Attesting Officer

Acting Commissioner of Patents and Trademarks